Feb. 21, 1928.
E. A. LE BEAU
1,659,882
SPRING SUPPORT FOR BRAKE BEAMS
Filed Dec. 12, 1924
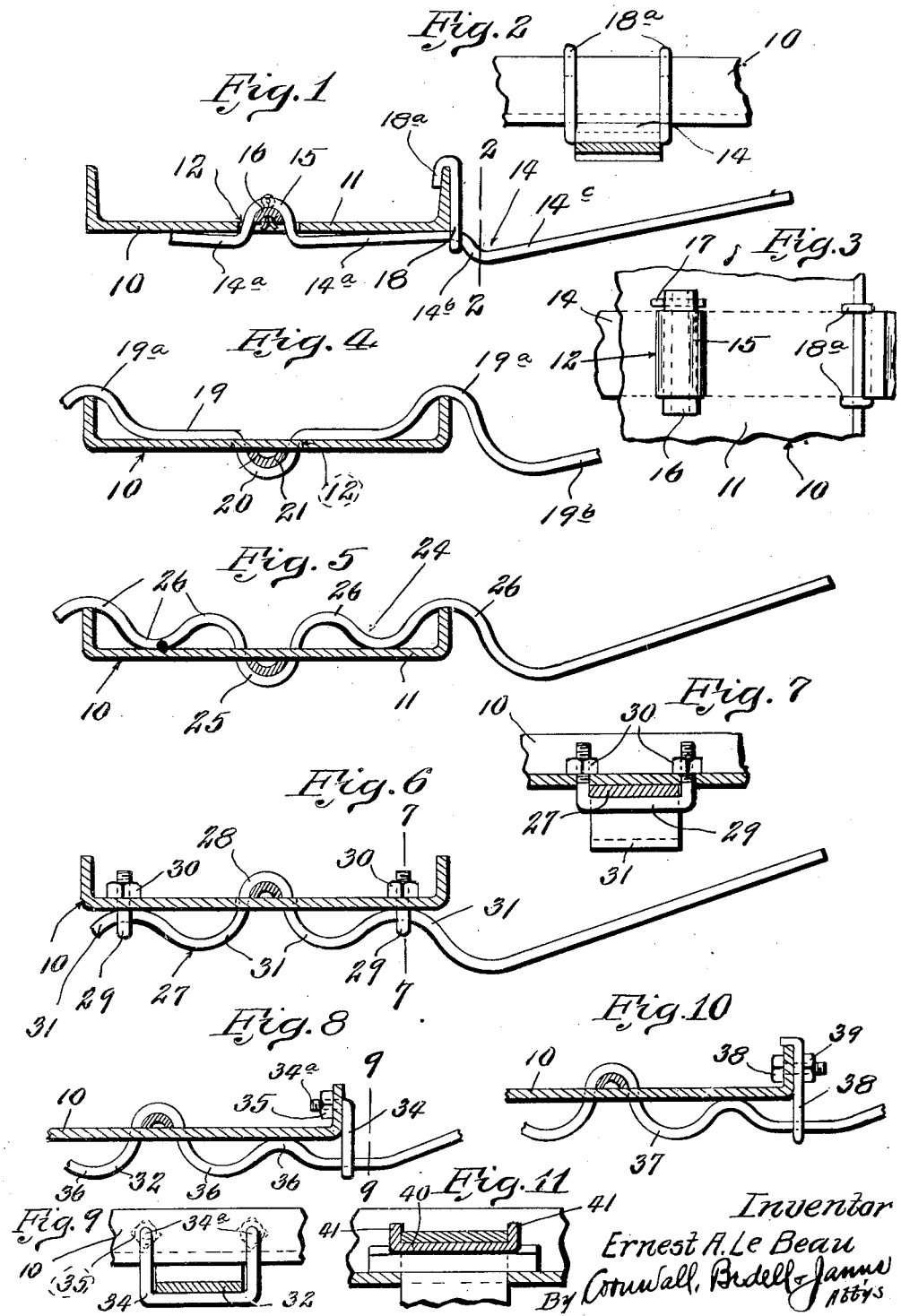
Inventor
Ernest A. Le Beau
By Cornwall, Birdell & Janney
Attys Patented Feb. 21, 1928.

1,659,882

UNITED STATES PATENT OFFICE.

ERNEST A. LE BEAU, OF CHICAGO, ILLINOIS, ASSIGNOR TO CHICAGO RAILWAY EQUIPMENT COMPANY, OF CHICAGO, ILLINOIS, A CORPORATION OF ILLINOIS.

SPRING SUPPORT FOR BRAKE BEAMS.

Application filed December 12, 1924. Serial No. 755,513.

This invention relates to new and useful improvements in brake beam spring supports and reinforcing means therefor and the objects of the invention are to provide a spring support having formed in its length a transversely disposed loop portion which is adapted to be seated in and project through an aperture formed in the web portion of a spring plank and to provide a suitable locking member insertable through said loop portion whereby said spring support is held against displacement.

Further objects of the invention are to provide auxiliary reinforcing means carried by the spring plank or other part of a car truck and engaging said spring support at points spaced from the point of its central attachment or support.

Still further objects of the invention are to form a brake beam support with a plurality of transversely disposed corrugations or bend portions which greatly increase the resiliency of said support and permit yielding movement thereof in placing in position said central attaching member and said auxiliary reinforcing means.

With these and other objects in view, my invention consists in certain novel features of construction and arrangement of parts, hereinafter more fully described and claimed and illustrated in the accompanying drawings, in which—

Figure 1 is a side elevational view of the support showing the spring plank in transverse cross section.

Figure 2 is a vertical cross section taken on line 2—2 of Figure 1.

Figure 3 is a fragmental plan view of the support and the spring plank.

Figure 4 is a view similar to Figure 1 and showing a modified form of support.

Figure 5 is a side elevational view of another further modified form of support.

Figure 6 is a side elevational view of the support showing the spring plank in cross section and showing a modified form of auxiliary reinforcing attaching means.

Figure 7 is a vertical cross section taken on line 7—7 of Figure 6.

Figure 8 is another modified form of auxiliary attaching and reinforcing means.

Figure 9 is a vertical cross section taken on line 9—9 of Figure 8.

Figure 10 shows another modified form of reinforcing means.

Figure 11 is a vertical cross section taken transversely through the support and longitudinally of the spring plank and showing modified means for locking the insertable member in operative position.

Referring by numerals to the accompanying drawings, 10 indicates a car truck part, such as a spring plank, in the web portion 11 of which is formed an aperture 12 which is preferably equidistant from the flanges of said spring plank.

In the form shown in Figures 1 to 3, a brake beam support 14 is arranged transversely of and against the underside of the spring plank and has its end or ends projecting under a brake beam or brake beams to form a third or fourth point support therefor. This support 14 is provided in its length with an upwardly presented bend or loop 15 which projects through the aperture 12. An insertable member 16, preferably tapered, is inserted through said loop and has its ends resting against the upper face of web 11, thereby preventing the withdrawal of loop 15 from aperture 16 and locking support 14 in position on said spring plank. A cotter pin 17 may be used to prevent the accidental withdrawal of member 16 from loop 15.

In order to reinforce support 14 end provide additional supporting and reinforcing means therefor, a U-shaped member, such as 18, is carried by the spring plank 10 and engages member 14 at a point spaced a suitable distance from the central point of attachment. In the present form, this U-shaped member is arranged adjacent to the flanges of the spring plank and the ends thereof are provided with hooks 18ª which engage the upwardly presented edges of the flanges of said spring plank. Thus member 14 is supported at additional points spaced from the central point of attachment, thereby relieving said member 14 of strain at its central part and reducing the danger of breakage thereof to minimum.

When member 14 is engaged by insertable member 16, and hooks or U-shaped members 18 the intermediate portions 14ª of said member are stressed or flexed and, by virtue of the resiliency of member 14 hold hooks 18 against displacement. Immediately after passing over the horizontal portions of U-shaped members 18, the outwardly extending portion or track 14ᵇ which is inclined upwardly, drops downwardly to form a bend or shoulder 14ᶜ which prevents free play of the members 18. The resiliency of support 14 facilitates the positioning of insertable member 16 and the attaching of U-shaped members 18 and at the same time prevents play and lost motion of the various parts.

In the form shown in Figure 4, a support 19 is disposed against the upper face of the spring plank and the loop portion 20 of said support is presented downwardly through the aperture 12 of said spring plank. An insertable member 21 is seated in said loop and its ends bear against the underside of said spring plank and lock said support thereon. Support 19 is provided with upwardly and thence downwardly curved portions or bends 19ᵃ which cross over the flanges of spring plank 10, and terminate in track portions 19ᵇ. When insertable member 21 is placed in position in loop 20, support 19 is drawn against the upper face and the edges of the spring plank, the latter serving as additional points of support or auxiliary reinforcing means and member 19 is held in engagement therewith by the tension under which it is placed.

In the form disclosed in Figure 5 a brake beam support 24 having a central downwardly presented loop 25 is arranged on the upper face of the spring plank and is provided with a series of corrugations or bends 26 which increase the resiliency of said support and provide on each side of the central point a number of auxiliary points of support or reinforcements.

In the form shown in Figures 6 and 7, a support 27 is disposed below the spring plank and is provided with an upwardly presented loop 28 for engaging the aperture formed in said spring plank, and receiving the usual insertable member. A U-shaped bolt 29 engages the support on each side of the loop 28 and is held in position on the spring plank by nuts 30 which engage the threaded ends of member 29 and hold it against web portion of the spring plank. Support 27 is provided in its length with a series of bends or corrugations 31 which increase the resiliency of the support and permit tensioning thereof when the attaching U-shaped bolts 29 are placed in position, The form shown in Figures 8 and 9 is similar to the preceding form except that the support 32 is engaged on each side of the spring plank by a U-shaped member 34, the threaded ends 34ᵃ of which are bent laterally and pass through apertures formed in the flanges of said spring plank to receive nuts 35 which secure each member 34 in position on the spring plank. Support 32 has formed in its length a series of transversely disposed bends or corrugations 36 and the apices of the upwardly presented bends are held against the underside of the spring plank when the U-shaped members 34 are placed in position whereby said support 32 is held under tension in engagement with the spring plank and the auxiliary reinforcing members 34.

In the form shown in Figure 10, a support 37 is engaged by members 38 which have their upper ends bent laterally and overlying the edges of the flanges of the spring plank and are secured in position to the spring plank by bolts and nuts 38 and 39.

In the form shown in Figure 11, an insertable member 40 is provided in its ends with tongues 41 which are adapted to be turned or bent outwardly and lock said member against displacement when the latter is inserted in the projecting loop portion of the brake beam support.

I claim:

1. In combination, a truck part having an aperture, a brake beam support arm having a projection extending through said aperture, said arm extending vertically away from said part adjacent to said aperture and having a return bend yieldingly engaging a surface on said part at a point spaced from said aperture, said arm being supported at a point spaced from said surface and beyond the point of said yielding engagement.

2. In combination a truck spring plank having an aperture between its sides, a brake beam support arm having a projection extending through said aperture, said arm extending vertically away from said spring plank adjacent to said aperture and having a return bend yieldingly engaging said spring plank at a point spaced from said aperture, said arm being positively supported at the edge of said spring plank and beyond the point of said yielding engagement.

3. In a car truck, a truck part, a support arm having a portion for attachment to said truck part, and having a series of corrugations at the side of said portion for engaging said part at points spaced from said portion.

In testimony whereof I hereunto affix my signature this 6th day of December, 1924.

ERNEST A. LE BEAU.